United States Patent
Ohno et al.

(10) Patent No.: US 8,202,601 B2
(45) Date of Patent: Jun. 19, 2012

(54) HONEYCOMB STRUCTURE AND MANUFACTURING METHOD OF THE HONEYCOMB STRUCTURE

(75) Inventors: Kazushige Ohno, Gifu (JP); Masafumi Kunieda, Gifu (JP); Takahiko Ido, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 626 days.

(21) Appl. No.: 12/343,965

(22) Filed: Dec. 24, 2008

(65) Prior Publication Data

US 2009/0291252 A1 Nov. 26, 2009

(30) Foreign Application Priority Data

May 20, 2008 (WO) ................. PCT/JP2008/059270

(51) Int. Cl.
*B32B 3/12* (2006.01)
*B01D 50/00* (2006.01)
*B01D 53/34* (2006.01)
*B01D 24/00* (2006.01)
*B01D 39/06* (2006.01)
*B01J 29/04* (2006.01)
*B01J 29/06* (2006.01)
*C03C 3/04* (2006.01)
*C03C 3/118* (2006.01)

(52) U.S. Cl. ........ 428/116; 422/180; 422/168; 422/181; 422/171; 502/60; 502/64; 502/67; 55/523; 55/522; 501/53; 501/59

(58) Field of Classification Search .................. None
See application file for complete search history.

(56) References Cited

U.S. PATENT DOCUMENTS

| | | | |
|---|---|---|---|
| 6,649,244 B2 | 11/2003 | Hamanaka et al. | |
| 7,507,684 B2 | 3/2009 | Hofmann et al. | |
| 7,851,041 B2 | 12/2010 | Ohno et al. | |
| 2005/0247047 A1* | 11/2005 | Takaya et al. | 60/284 |
| 2005/0266992 A1 | 12/2005 | Ohno et al. | |
| 2006/0068159 A1 | 3/2006 | Komori et al. | |
| 2006/0292393 A1* | 12/2006 | Kunieda | 428/688 |
| 2007/0130897 A1* | 6/2007 | Sakaguchi et al. | 55/523 |

(Continued)

FOREIGN PATENT DOCUMENTS

CN 1997452 A 7/2007

(Continued)

OTHER PUBLICATIONS

Chinese Office Action for corresponding CN Application No. 200880019932.3, Feb. 29, 2012.

*Primary Examiner* — Gordon R Baldwin
(74) *Attorney, Agent, or Firm* — Ditthavong Mori & Steiner, P.C.

(57) ABSTRACT

A honeycomb structure includes at least one honeycomb unit having opening ratio (P) of at least approximately 50% and at most approximately 65% and a cell density ρ of at least approximately $31/cm^2$ and at most approximately $93/cm^2$. The honeycomb unit includes an inorganic binder and at least approximately 230 g/L of zeolite in which L represents an apparent volume. The honeycomb unit further includes and a plurality of cell walls extending from a first end to a second end of the honeycomb unit along a longitudinal direction of the honeycomb unit to define cells. The cell walls have a surface roughness Ra of at least approximately 1 μm and at most approximately 30 μm.

22 Claims, 3 Drawing Sheets

U.S. PATENT DOCUMENTS

2007/0259770 A1 11/2007 Hofmann et al.
2008/0220205 A1* 9/2008 Miwa et al. .................. 428/116

FOREIGN PATENT DOCUMENTS

| CN | 101066531 | 11/2007 |
| EP | 0519073 | 12/1992 |
| EP | 1752630 | 2/2007 |
| EP | 1779930 | 5/2007 |
| EP | 1927392 | 6/2008 |
| EP | 2105182 | 9/2009 |
| JP | 07-132230 | 5/1995 |
| JP | 2005-177570 | 7/2005 |
| WF | WO 2005/063653 | 7/2005 |
| WO | WO 01/60514 | 8/2001 |
| WO | WO 2004/113252 | 12/2004 |
| WO | WO 2007/052479 | 5/2007 |

* cited by examiner

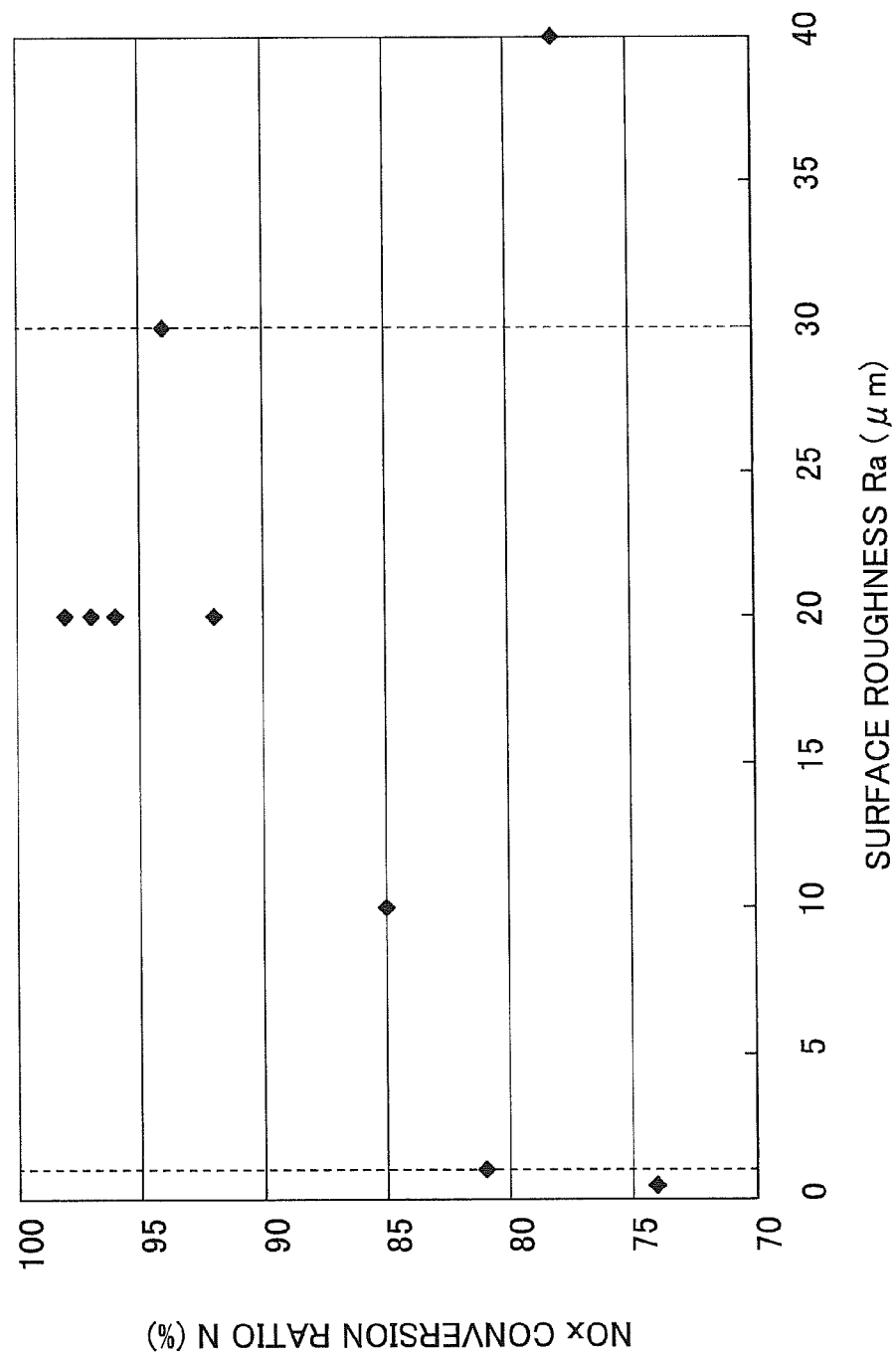

HONEYCOMB STRUCTURE AND MANUFACTURING METHOD OF THE HONEYCOMB STRUCTURE

CROSS-REFERENCE TO RELATED APPLICATIONS

The present application claims priority under 35 U.S.C §119 to PCT Application PCT/JP2008/059270 filed May 20, 2008, the entire contents of which are incorporated herein by reference.

BACKGROUND OF THE INVENTION

1. Field of the Invention

The present invention generally relates to a honeycomb structure and a manufacturing method of the honeycomb structure.

2. Discussion of Background

Although many technologies have been developed in the field of conversion of exhaust gas of automobiles, sufficient measures may not be taken for the conversion of the exhaust gas due to increasing traffic. Restrictions on the exhaust gas of the automobiles will become further strengthened. Particularly, restriction of NOx in the exhaust gas of diesel engines will become extremely strict. Conventionally, reduction of NOx has been made by controlling the combustion system of an engine. However, recently, this has not been sufficient.

As a NOx conversion system of the diesel engine corresponding to the above-mentioned problems, a NOx deoxidation system (called an "SCR system") where ammonia is used as a deoxidant has been suggested. A honeycomb structure has been known as a catalyst carrier used for such a system.

The honeycomb structure has, for example, plural cells (through holes) extending from one of end surfaces of the honeycomb structure to another end surface in a longitudinal direction of the honeycomb structure. These cells are separated by cell walls where the catalysts are carried. Accordingly, in a case where the exhaust gas is introduced in the above-mentioned honeycomb structure, since NOx contained in the exhaust gas is converted by the catalyst carried by the cell wall, the exhaust gas can be processed.

It is normal practice that the cell walls of such a honeycomb structure are formed of cordierite and, for example, zeolite (formed by ion exchange with iron, copper, or the like) is carried as a catalyst in the cell walls. In addition to this, an example where zeolite is used for the cell walls so that the honeycomb structure is formed has been suggested (see, for example, International Publication Pamphlet No. WO 2005/063653).

The entire contents of International Publication Pamphlet No. WO 2005/063653 are incorporated herein by reference.

SUMMARY OF THE INVENTION

According to one aspect of the present invention, a honeycomb structure includes at least one honeycomb unit having opening ratio (P) of at least approximately 50% and at most approximately 65% and a cell density ρ of at least approximately 31/cm$^2$ and at most approximately 93/cm$^2$. The honeycomb unit includes an inorganic binder and at least approximately 230 g/L of zeolite in which L represents an apparent volume. The honeycomb unit further includes a plurality of cell walls extending from a first end to a second end of the honeycomb unit along a longitudinal direction of the honeycomb unit to define cells. The cell walls have a surface roughness Ra of at least approximately 1 μm and at most approximately 30 μm.

According to another aspect of the present invention, a manufacturing method of a honeycomb structure having at least one honeycomb unit includes providing a raw material paste and a die. The raw material paste includes an inorganic binder and inorganic particles including zeolite so that the honeycomb unit includes at least approximately 230 g/L of zeolite in which L represents an apparent volume. The raw material paste is extrusion molded into at least one honeycomb unit molded body using the die. The honeycomb unit molded body is sintered to be the honeycomb unit having a longitudinal direction and a plurality of cell walls extending from a first end to a second end of the honeycomb unit along the longitudinal direction to define cells. The die is designed so that the honeycomb unit molded body has predetermined sizes of the cells and predetermined thicknesses of the cell walls, thereby providing the honeycomb unit which has an opening ratio (P) of at least approximately 50% and at most approximately 65% and a cell density ρ of at least approximately 31/cm$^2$ and at most approximately 93/cm$^2$. A surface roughness of a surface of the die is adjusted so that a surface roughness Ra of the cell walls of the honeycomb unit is at least approximately 1 μm and at most approximately 30 μm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a graph showing relationships between surface roughness Ra and a NOx conversion ratio, in examples and comparison examples of the present invention.

DETAILED DESCRIPTION OF THE EMBODIMENTS

Next, exemplary embodiments of the present invention are described with reference to the accompanying drawings.

In the above-mentioned conventional honeycomb structure, there are demands for further improvement of NOx conversion rate.

Normally, in order to improve the NOx conversion ratio, it may be effective to decrease the opening ratio of the honeycomb structure so as to increase surface areas of the cell walls used for reaction. However, if the opening ratio of the honeycomb structure is decreased, pressure loss may be generated. Accordingly, in an ordinary case, it may not be possible to change the opening ratio of the honeycomb structure.

The embodiments of the present invention can provide a honeycomb structure having a good NOx conversion ratio without drastically changing an opening ratio of the honeycomb structure comparing the conventional honeycomb structure.

Figure 1:
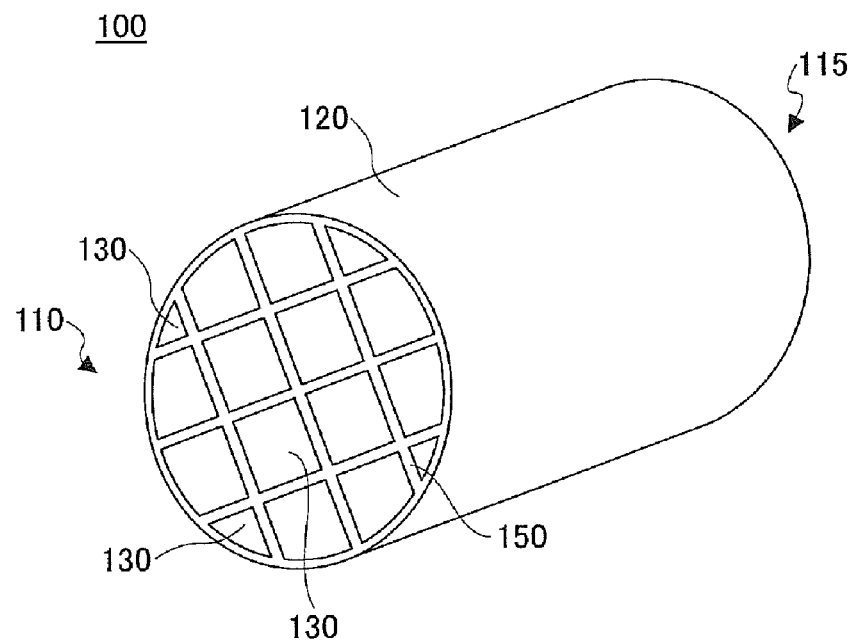
FIG. 1 is a perspective view schematically showing an example of a honeycomb structure of an embodiment of the present invention.

FIG. 1 is a schematic diagram showing a honeycomb structure according to an embodiment of the present invention. Further, FIG. 2 is a schematic diagram showing a honeycomb unit that is the basic unit of the honeycomb structure shown in FIG. 1.

As shown in FIG. 1, a honeycomb structure 100 according to the embodiment of the present invention has two open faces (end faces) 110 and 115. In addition, a coat layer 120 is provided on the peripheral surface of the honeycomb structure 100 except its end faces 110 and 115.

Figure 2:
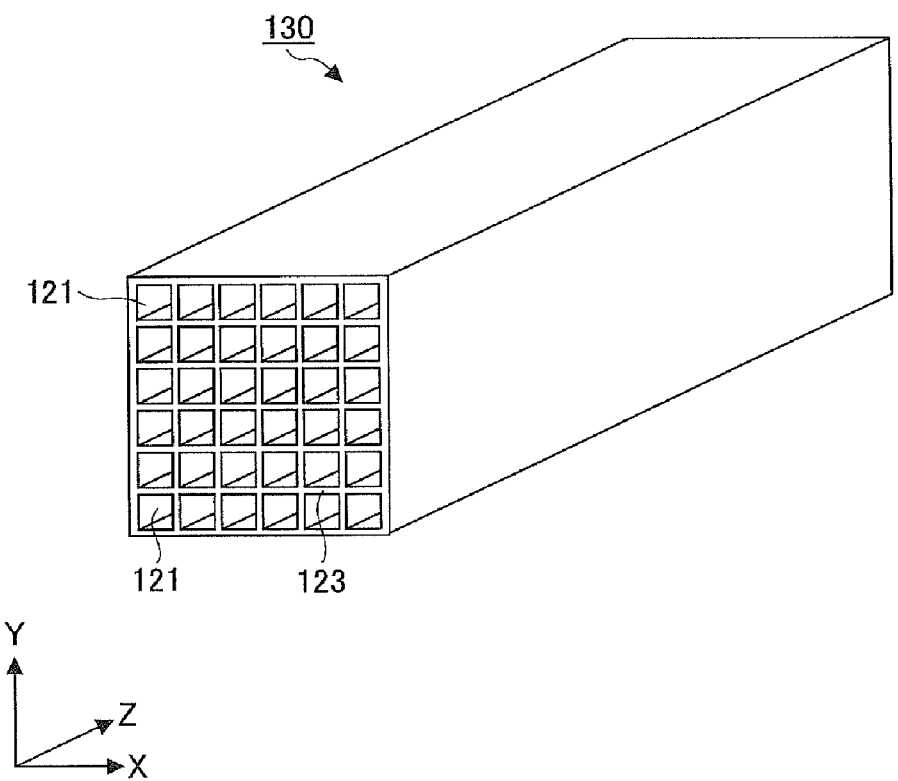
FIG. 2 is a perspective view schematically showing an example of a honeycomb unit constituting the honeycomb structure of FIG. 1.

The honeycomb structure 100 is formed by, for example, joining multiple pillar ceramic honeycomb units 130 shown in FIG. 2 (16 units in a four-by-four matrix in the case of FIG. 1) by interposing an adhesive layer 150 and thereafter cutting the exterior side into a predetermined shape (a cylindrical shape in the case of FIG. 1).

As shown in FIG. 2, the honeycomb unit 130 includes multiple cells (through holes) 121 and cell walls 123. The multiple cells (through holes) 121 extend from one end to the other end of the honeycomb unit 130 along its longitudinal directions and have two open end faces. The cell walls 123 separate the cells 121.

The honeycomb unit 130 includes zeolite which contributes to a NOx conversion reaction as an SCR system. Accordingly, in a case where the honeycomb structure of the embodiment of the present invention is used as a catalyst carrier for converting NOx, it is not always necessary to carry a noble metal catalyst on the cell walls. However, the noble metal catalyst may be carried on the cell walls. It is preferable that approximately 230 g/L or more of zeolite be contained in the honeycomb unit 130. It is preferable that approximately 270 g/L or less of zeolite be contained in the honeycomb unit 130.

The honeycomb structure 100 having the above-discussed structure is, for example, used as a catalyst carrier of a urea SCR system having a urea tank. When exhaust gas is introduced in the urea SCR system, urea in the urea tank reacts with water in the exhaust gas so that ammonia is generated.

$$CO(NH_2)_2 + H_2O \rightarrow 2NH_3 + CO_2 \quad \text{Formula (1)}$$

When the ammonia flows in the cell from one of the open faces (end faces), for example, the open face 110, with the exhaust gas containing NOx, the following reactions are generated on zeolite contained in the cell wall and in the mixed gas.

$$4NH_3 + 4NO + O_2 \rightarrow 4N_2 + 6H_2O \quad \text{Formula (2-1)}$$

$$8NH_3 + 6NO_2 \rightarrow 7N_2 + 12H_2O \quad \text{Formula (2-2)}$$

$$2NH_3 + NO + NO_2 \rightarrow 2N_2 + 3H_2O \quad \text{Formula (2-3)}$$

After that, converted exhaust gas is discharged from another open face (end face), for example, the open face 115, of the honeycomb structure 100.

Thus, it is possible to treat NOx in the exhaust gas by introducing the exhaust gas into the honeycomb structure 100. Furthermore, although in the example ureic water is hydrolyzed so that $NH_3$ is supplied, $NH_3$ may be supplied by another method.

Further improvement of the NOx conversion ratio has been in demand in the above-discussed honeycomb structure.

Normally, in order to improve the NOx conversion ratio, it may be effective to decrease the opening ratio P of the honeycomb unit so as to increase the content of zeolite per unit volume. However, if the opening ratio P of the honeycomb unit is decreased, a problem such as increase of pressure loss may be generated.

Accordingly, in actual practice, the opening ratio P of the honeycomb unit may not be drastically changed due to the limitation of properties of the honeycomb structure. It is normal practice that the opening ratio of the honeycomb unit is in the range of approximately 50% through approximately 65%.

On the other hand, in the embodiment of the present invention, two properties, namely, a cell density ρ of the honeycomb unit and surface roughness Ra of the cell wall, are controlled.

The cell density ρ of the honeycomb unit and the surface roughness Ra of the cell wall may have influence on the surface area of the cell wall. For example, by increasing the cell density ρ of the honeycomb unit (the cell density ρ is equal to or greater than approximately $31/cm^2$), the surface areas of the cell walls are increased so that areas where conversion reactions of NOx expressed by the above-mentioned formulas (2-1), (2-2), and (2-3) occur may be increased.

In a case where the cell density ρ is drastically increased (the cell density ρ is equal to or greater than approximately $94/cm^2$), pressure loss may become drastically large in the honeycomb structure having such a honeycomb unit and the cell walls may become too thin; therefore the strength of the cell wall may be degraded.

Accordingly, in the embodiment of the present invention, the cell density ρ is controlled in the range of "approximately $31/cm^2 \leq$ the cell density $\rho \leq$ approximately $93/cm^2$". In particular, it is preferable that the cell density ρ be in the range of "approximately $47/cm^2 \leq$ the cell density $\rho \leq$ approximately $78/cm^2$".

Similarly, by increasing the surface roughness Ra of the cell walls (the surface roughness Ra is equal to or greater than approximately 1 μm), the surface areas where conversion reactions of NOx expressed by the above-mentioned formulas (2-1), (2-2), and (2-3) occur may be increased.

In a case where the surface roughness Ra of the cell walls is drastically increased (the surface roughness Ra is equal to or greater than approximately 40 μm), the NOx conversion ratio may be reduced in the honeycomb structure having such a honeycomb unit. This may be because the exhaust gas does not permeate into the inside of the cell walls.

Accordingly, in the embodiment of the present invention, the surface roughness Ra of the cell walls is controlled in the range of "1 μm ≤ the cell density $\rho \leq 30$ μm". In particular, it is preferable that the surface roughness Ra of the cell walls be in the range of "20 μm ≤ the surface roughness Ra ≤ 30 μm".

In the specification and claims, the surface roughness Ra means a so-called arithmetic mean height defined at JISB0601 (Chapter 4.2.1) and is an average of an absolute value of Z(x) (height of a contour curve in an optional position X) in the standard length.

In the embodiments of the present invention, surface roughness at five points randomly selected from a surface of a subject sample is measured so that the surface roughness Ra is calculated as an average of the surface roughness at the five points. SV-C3100 manufactured by Mitsutoyo Corporation is used as a surface roughness meter.

The entire contents of JISB0601 are incorporated herein by reference.

Thus, in the embodiments of the present invention, the cell density ρ and the surface roughness Ra are controlled so as to be in proper ranges. Accordingly, in the embodiments of the present invention, even if the opening rate P of the honeycomb unit is not changed (approximately 50%≦P≦approximately 65%), it may be possible to improve the conversion rate of NOx of the honeycomb structure of such a honeycomb unit.

Here, the honeycomb unit 130 includes an inorganic binder in addition to zeolite.

Zeolite may take any structure, for example, β-type, Y-type, ferrierite, ZSM-5, mordenite, faujasite, zeolite A, zeolite L or the like. Ion exchange of zeolite may be made by Fe, Cu, Ni, Co, Zn, Mn, or the like. In addition, it is preferable that the zeolite weight ratio of silica of to alumina be in a range of approximately 30 through approximately 50.

For the inorganic binder, inorganic sol, clay based binder, or the like may be used. Specific examples of such inorganic sol are alumina sol, silica sol, titania sol and liquid glass. Specific examples of the clay based binder are clays of double-chain structure, such as white earth, kaolin, montmorillonite, sepiolite and attapulgite. One kind selected from these clays may solely be used, or two or more kinds may be used together.

Among the above-mentioned inorganic materials of the inorganic binder, it is preferable to use at least one selected from the group consisting of alumina sol, silica sol, titania sol, liquid glass, sepiolite and attapulgite.

In order to improve the strength of the honeycomb unit, inorganic particles and/or inorganic fibers other than zeolite may be contained. As the inorganic particles other than zeolite, particles of alumina, silica, zirconia, titania, ceria, mullite, zeolite, and others are preferable. Precursors of these particles may be used. One kind selected from these particles may solely be used as the inorganic particles, or two or more kinds may be used together. Among these particles, particles of alumina and zirconia are most preferable.

In a case when inorganic fibers are added to the honeycomb unit 130, a desirable material of such inorganic fibers is alumina, silica, silicon carbide, silica-alumina, glass, potassium titanate, aluminum borate or the like. One kind selected from them may solely be used, or two or more kinds may be used together. Among them, alumina fibers are preferable. Whisker are included in the inorganic fibers.

As to the total amount (weight rate of the honeycomb unit) of the inorganic particles (zeolite and inorganic particles other than zeolite) included in the honeycomb unit 130, a lower limit is preferably approximately 30 wt %, more preferably approximately 40 wt %, and further preferably approximately 50 wt %. On the other hand, an upper limit is preferably approximately 90 wt %, more preferably approximately 80 wt %, and further preferably approximately 75 wt %. When the total amount of the inorganic particles (zeolite and inorganic particles other than zeolite) is equal to or greater than approximately 30 wt %, the amount of inorganic particles contributing to the NOx conversion may not be relatively reduced. On the other hand, when the total amount of the inorganic particles is equal to or less than approximately 90 wt %, the strength of the honeycomb unit may not be reduced.

As for the amount of the inorganic binder included in the honeycomb unit, the lower limit is preferably approximately 5 wt % or more as solid content, more preferably approximately 10 wt % or more, and further preferably approximately 15 wt % or more. On the other hand, the upper limit is preferably approximately 50 wt % or less as solid content, more preferably approximately 40 wt % or less, and further preferably approximately 35 wt % or less. When the content of the inorganic binder as a solid content is equal to or greater than 5 wt % as solid content, the strength of the manufactured honeycomb unit may not be reduced. On the other hand, when the content is equal to or less than 50 wt % as solid content, the forming processability of the raw material composition may not be reduced.

In the case when inorganic fibers are included in the honeycomb unit, a lower limit of the total amount of the inorganic fibers is preferably approximately 3 wt %, more preferably approximately 5 wt %, and further preferably approximately 8 wt %. On the other hand, an upper limit is preferably approximately 50 wt %, more preferably approximately 40 wt %, and further preferably approximately 30 wt %. In a case where the content of the inorganic fibers is equal to or greater than approximately 3 wt %, the contribution of the inorganic fibers to improving the strength of the honeycomb unit may not be degraded. In a case where the content of the inorganic fibers is equal to or less than approximately 50 wt %, it may not be the case that the amount of inorganic particles contributing to the NOx conversion is relatively reduced.

There is no limitation of the shape of a cross section of the honeycomb unit 130 cut perpendicular to the longitudinal direction. It may take any shape as long as the honeycomb units 130 can be joined by interposing an adhesive layer. The shape of the honeycomb unit 130 cross section may be square, rectangular, hexagonal, fan-shaped or the like.

In addition, the shape of a cross section of the cell 121 cut perpendicular to the longitudinal direction is also not particularly limited. Therefore, the shape is not limited to square, and may be triangular, polygonal, or the like for example.

The thickness of the cell wall 123 of the honeycomb unit 130 is not particularly limited, yet a preferable lower limit is 0.1 mm in view of the strength and a preferable upper limit is 0.4 mm in views of the NOx conversion performance.

The honeycomb structure 100 of the embodiment of the present invention may take any shape. For example, besides a cylindrical shape as shown in FIG. 1, the honeycomb structure 100 may be cylindroid, square pillar, polygonal pillar or the like, for example.

As to the adhesive layer 150 of the honeycomb structure 100, its raw material is a paste (an adhesive paste). There is no limitation of the adhesive paste. For example, a mixture of the inorganic particles and the inorganic binder; a mixture of the inorganic binders and the inorganic fibers, or a mixture of the inorganic particles, the inorganic binders, and the inorganic fibers can be used. In addition, an organic binder can be further added.

Materials the same as those forming the honeycomb unit can be used as the inorganic particles, inorganic binders, and the inorganic fibers.

In addition, there is no limitation of organic binders. For example, polyvinyl alcohol, methylcellulose, ethyl cellulose, carboxymethylcellulose, or the like may be used. One kind selected from them may solely be used, or a mixture of two or more kinds may be used instead. Among these organic binders, carboxymethylcellulose is preferable.

It is preferable that the thickness of the adhesive layer 150 be in the range of approximately 0.3 mm through approximately 2 mm. If the thickness of the adhesive layer 150 is equal to or greater than approximately 0.3 mm, sufficient joining strength may be easily obtained. If the thickness of the adhesive layer 150 is equal to or less than approximately 2 mm, the pressure loss may not be increased. The number of the honeycomb units to be joined is properly selected depending on the size of the honeycomb structure.

An outer peripheral coat layer 120 of the honeycomb structure 100 is made of a material whose raw material is a paste containing the inorganic particles, the inorganic binders and the inorganic fibers the same as the material forming the honeycomb unit and the organic binders.

The outer peripheral coat layer 120 may be made of a material the same as or different from that of the adhesive layer 150. However, it is preferable that the outer peripheral coat layer 120 be made of a material the same as that of the adhesive layer 150. This is because peeling or cracks may not be generated in the outer peripheral coat layer 120 as well as the adhesive layer 150. If necessary, balloons, which are hollow microspheres including oxide based ceramic or pore-forming agents, such as spherical acrylic particles or graphite may be added to the raw material paste. The thickness of the outer peripheral coat layer 120 is preferably approximately 0.1 mm through approximately 2.0 mm.

The above description is given of an example of the honeycomb structure 100 formed by joining plural honeycomb units 130 by interposing the adhesive layers 150, like the one shown in FIG. 1.

Figure 3:
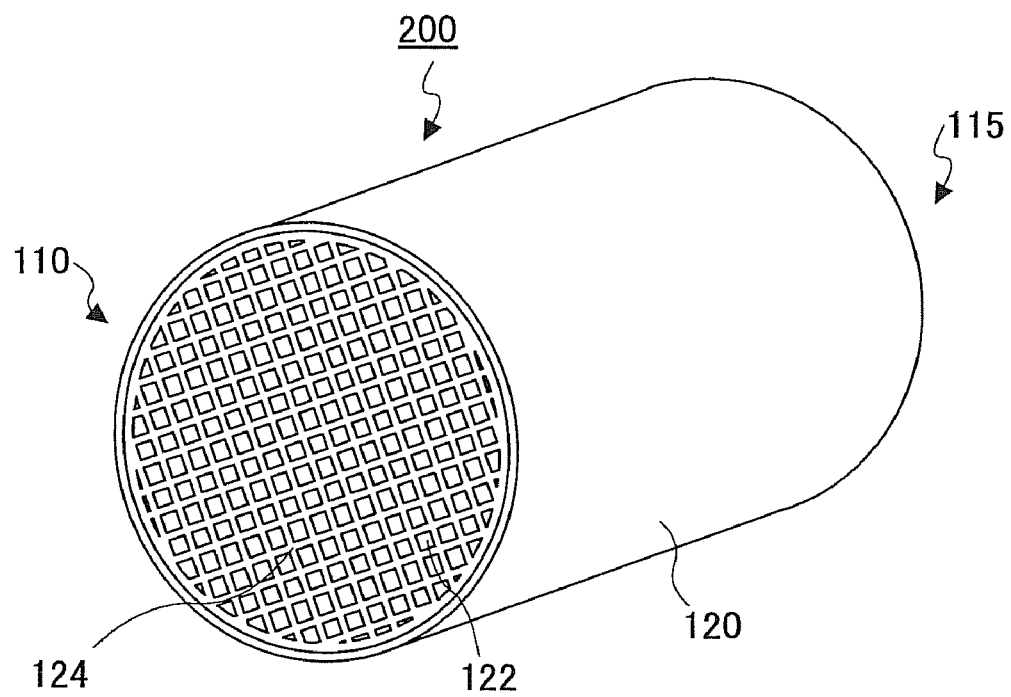
FIG. 3 is a perspective view schematically showing another example of a honeycomb structure of the embodiment of the present invention.

FIG. 3 shows another example of a honeycomb structure of the embodiment of the present invention. A honeycomb structure 200 is the same as the honeycomb structure 100, except that the honeycomb structure 200 is formed of a single honeycomb unit in which plural cells 122 are arranged parallel to each other in the longitudinal direction, separated by cell walls 124. Although the outer peripheral coat layer 120 is formed on the outer peripheral surface of the honeycomb structure the outer peripheral coat layer 120 may or may not be provided on the outer peripheral surface of the honeycomb structure 200.

[Method of Manufacturing Honeycomb Structure]

Next, an example of the method of manufacturing the honeycomb structure of the embodiment of the present invention is discussed. Here, a manufacturing method of the honeycomb structure 100 formed by plural honeycomb units shown in FIG. 1 is discussed as an example.

First, a honeycomb unit molded body is made by, for example, performing extrusion molding using a raw material paste that includes primarily inorganic particles and inorganic binder including zeolite and may also include inorganic fibers which may be added on an as-needed basis.

In addition to these inorganic materials, organic binders, dispersion media and shaping aids may be added to the raw material paste according to the formability of the raw material paste. The kinds of the organic binders are not particularly limited, and examples of such are one or more kinds of organic binders selected from a group consisting of methylcellulose, carboxymethylcellulose, hydroxyethylcellulose, polyethylene glycol, phenolic resin, epoxy resin and the like. The relative quantity of the organic binders to be blended is preferably approximately 1 part by weight to approximately 10 parts by weight when the total of the inorganic particles, inorganic binders and inorganic fibers is 100 parts by weight.

The kinds of the dispersion media are not particularly limited, and examples of such are water, organic solvents (e.g. benzene), and alcohols (e.g. methanol). The kinds of the shaping aids are not particularly limited, and examples of such are ethylene glycols, dextrins, fatty acids, fatty acid soaps and polyalcohols.

The raw material paste is not particularly limited, but is preferably mixed, kneaded and the like. For example, the paste may be mixed using a mixer, attritor or the like, or may be sufficiently kneaded by a kneader or the like. The method of forming and shaping the raw material paste is not particularly limited. However, it is preferable to form a shape having cells by, for example, extrusion molding or the like.

Next, the resultant molded body is preferably dried. A drying apparatus used to dry the molded body is not particularly limited, and examples of such are a microwave drying apparatus, a hot air drying apparatus, a dielectric drying apparatus, a reduced-pressure drying apparatus, a vacuum drying apparatus and a freeze drying apparatus.

Also, the resultant molded body is preferably degreased. Degreasing conditions are not particularly limited and should be appropriately determined according to the kinds and amounts of organic substances included in the molded body; however, the molded body is degreased preferably at approximately 400° C. for approximately two hours.

Furthermore, the resultant molded body is preferably fired. Firing conditions are not particularly limited; however, the molded body is fired preferably at approximately 600° C. through approximately 1200° C., and more preferably at approximately 600° C. through approximately 1000° C. This is because, if the firing temperature is higher than approximately 600° C., sintering may efficiently progress, which may not lead to a reduction in the strength of the honeycomb unit 130. On the other hand, if the firing temperature is equal to or lower than approximately 1200° C., sintering may not excessively progress, which may not lead to a decrease of the reaction sites of the zeolite.

It is possible to easily control the cell density $\rho$ of the honeycomb unit by designing the die (mold) so that the measurement of the molded cell and the thickness of the cell wall have proper values in a step of manufacturing the honeycomb unit molded body by the above-mentioned extrusion molding.

In addition, it is possible to easily control the surface roughness Ra of the cell wall of the honeycomb unit by controlling, in advance, the surface roughness of a part of the mold, the part defining the cell wall of the honeycomb unit.

Subsequently, an adhesive layer paste to be later formed as an adhesive layer is applied at a uniform thickness on the lateral surface of the honeycomb unit 130 that has been obtained from the previous process. After that, other honeycomb units 130 are sequentially stacked on top of the honeycomb unit 130 by interposing the adhesive layer paste. By repeating this process, a honeycomb structure of a desired size (e.g. honeycomb units arranged in 4 rows and 4 columns) is manufactured.

Next, the honeycomb structure is heated to dry and solidify the adhesive layer paste, whereby the adhesive layers are formed and also the honeycomb units are firmly fixed to each other.

Subsequently, a cutting process is performed on the honeycomb structure 100 to form it into, for example, a cylindrical shape using a diamond cutter or the like, to thereby manufacture the honeycomb structure 100 having a desired peripheral shape.

Plural honeycomb units having different configurations where cell walls are provided at a peripheral surface may be manufactured so that the honeycomb structure surface may be formed via the adhesive layer. In this case, the cutting process is omitted.

Then, after an outer peripheral coat layer paste is applied on the peripheral surface (lateral surface) of the honeycomb structure 100, the coat layer paste is dried and solidified to form a coat layer.

It is preferable that the honeycomb structure be degreased after the plural honeycomb units are joined by the adhesive layer (this process is performed after the outer peripheral coat layer is provided).

By the degreasing process, in a case where organic binders are included in the adhesive layer paste and coat layer paste, the organic binders can be degreased and removed. Degreasing conditions are appropriately determined according to the kinds and amounts of organic substances included in the pastes. In a normal case, degreasing is carried out at approximately 700° C. for approximately two hours.

According to the above-discussed procedure, the honeycomb structure 100 shown in FIG. 1 can be manufactured.

According to embodiments of the present invention, it is possible to provide a honeycomb structure having a good NOx conversion ratio without drastically changing an opening ratio of the honeycomb structure compared to the conventional honeycomb structure.

EXAMPLES

Next, examples of the embodiment of the present invention are discussed in detail.

Example 1

First, 2600 parts by weight of Fe zeolite particles (average particle diameter is 2 μm), 2600 parts by weight of alumina sol, 780 parts by weight of alumina fibers (average fiber length 100 μm, average fiber diameter 6 μm), and 410 parts by weight of methylcellulose were mixed together. This mixture ratio is called "blending ratio A".

Next, plasticizer and lubricant agent (trademark "uniroove") were added to the above-mentioned mixture and mixed and so that a mixed composition was obtained.

The Fe zeolite particles were made by ion exchange of 3 wt % of the zeolite weight with Fe. Fe ion exchange was performed by impregnating the zeolite particles in an iron nitride ammonium solution. Concentration of the iron nitride ammonium solution was controlled so that the zeolite contained 3 wt % iron. β zeolite was used as the zeolite. The amount of ion exchange was determined by IPC emission analysis using an apparatus IPCS-8100 manufactured by Shimadzu Corporation.

Next, extrusion molding of this mixed composition was performed by an extrusion molding apparatus so that the honeycomb unit molded body was obtained.

Next, the molded body was sufficiently dried using a microwave drying apparatus and a hot air drying apparatus, and then subjected to a degreasing process at 400° C. for two hours.

After that, the molded body was sintered at 700° C. for two hours so that the honeycomb unit (longitudinal length of 35 mm×horizontal length of 35 mm×full length of 150 mm) of the Example 1 was manufactured.

The thickness of the cell wall was 0.33 mm (13 mil); the cell density ρ was 34/cm$^2$ (220 cpsi); the surface roughness Ra was 1 μm; and the opening ratio was 65%. The amount of zeolite contained in the honeycomb unit per an apparent volume was 250 g/L.

Then, a cutting process was further performed on the honeycomb unit along the axis direction to obtain a honeycomb unit (diameter 30 mm×length 50 mm) to be used as an evaluation sample. By using this evaluation sample, the following test was conducted.

Example 2

A honeycomb unit was manufactured by the same method as that in the Example 1 but by extrusion molding using a die having a surface roughness different from that used in the Example 1.

The thickness of the cell wall was 0.33 mm (13 mil); the cell density ρ was 34/cm$^2$ (220 cpsi), the surface roughness Ra was 10 μm; and the opening ratio was 65%. The amount of zeolite contained in the honeycomb unit per an apparent volume was 250 g/L.

Example 3

First, 1900 parts by weight of Fe zeolite particles (average particle diameter 2 μm), 1100 parts by weight of alumina particles (average particle diameter 2 μm), 2600 parts by weight of alumina sol, 780 parts by weight of alumina fibers (average fiber length 100 μm, average fiber diameter 6 μm), and 410 parts by weight of methylcellulose were mixed together. This mixture ratio is called "blending ratio B".

Next, plasticizer and lubricant agent (trademark "uniroove") were added to the above-mentioned mixture and mixed and so that a mixed composition was obtained.

After that, a honeycomb unit was manufactured by the same method as that in the Example 1 but by extrusion molding using a die having a surface roughness different from that used in the Example 1.

The thickness of the cell wall was 0.33 mm (13 mil); the cell density ρ was 62/cm$^2$ (400 cpsi), the surface roughness Ra was 20 μm; and the opening ratio was 55%. The amount of zeolite contained in the honeycomb unit per an apparent volume was 250 g/L.

Example 4

First, 2250 parts by weight of Fe zeolite particles (average particle diameter 2 μm), 550 parts by weight of alumina particles (average particle diameter 2 μm), 2600 parts by weight of alumina sol, 780 parts by weight of alumina fibers (average fiber length 100 μm, average fiber diameter 6 μm), and 410 parts by weight of methylcellulose were mixed together. This mixture ratio is called "blending ratio C".

Next, plasticizer and lubricant agent (trademark "uniroove") were added to the above-mentioned mixture and mixed and so that a mixed composition was obtained.

After that, a honeycomb unit was manufactured by the same method as that in the Example 1 but by extrusion molding using a die having a surface roughness different from that used in the Example 1.

The thickness of the cell wall was 0.33 mm (13 mil); the cell density ρ was 47/cm$^2$ (300 cpsi), the surface roughness Ra was 20 μm; and the opening ratio was 60%. The amount of zeolite contained in the honeycomb unit per an apparent volume was 250 g/L.

Example 5

A honeycomb unit was manufactured by the same method as that in the Example 1 but by extrusion molding using a die having a surface roughness different from that used in the Example 1.

The thickness of the cell wall was 0.20 mm (8 mil); the cell density ρ was 93/cm$^2$ (600 cpsi), the surface roughness Ra was 20 μm; and the opening ratio was 65%. The amount of zeolite contained in the honeycomb unit per an apparent volume was 250 g/L.

Example 6

A honeycomb unit was manufactured by the same method as that in the Example 1 but by extrusion molding using a die having a surface roughness different from that used in the Example 1.

The thickness of the cell wall was 0.25 mm (10 mil); the cell density ρ was 62/cm² (400 cpsi), the surface roughness Ra was 20 μm; and the opening ratio was 65%. The amount of zeolite contained in the honeycomb unit per an apparent volume was 250 g/L.

Example 7

A honeycomb unit was manufactured by the same method as that in the Example 1 but by extrusion molding using a die having a surface roughness different from that used in the Example 1.

The thickness of the cell wall was 0.28 mm (11 mil); the cell density ρ was 47/cm² (300 cpsi), the surface roughness Ra was 20 μm; and the opening ratio was 65%. The amount of zeolite contained in the honeycomb unit per an apparent volume was 250 g/L.

Example 8

A honeycomb unit was manufactured by the same method as that in the Example 1 but by extrusion molding using a die having a surface roughness different from that used in the Example 1.

The thickness of the cell wall was 0.30 mm (12 mil); the cell density ρ was 42/cm² (270 cpsi), the surface roughness Ra was 20 μmm; and the opening ratio was 65%. The amount of zeolite contained in the honeycomb unit per an apparent volume was 250 g/L.

Example 9

A honeycomb unit was manufactured by the same method as that in the Example 1 but by extrusion molding using a die having a surface roughness different from that used in the Example 1.

The thickness of the cell wall was 0.33 mm (13 mil); the cell density ρ was 34/cm² (220 cpsi), the surface roughness Ra was 20 μm; and the opening ratio was 65%. The amount of zeolite contained in the honeycomb unit per an apparent volume was 250 g/L.

Example 10

A honeycomb unit was manufactured by the same method as that in the Example 1 but by extrusion molding using a die having a surface roughness different from that used in the Example 1.

The thickness of the cell wall was 0.33 mm (13 mil); the cell density ρ was 34/cm² (220 cpsi), the surface roughness Ra was 30 μm; and the opening ratio was 65%. The amount of zeolite contained in the honeycomb unit per an apparent volume was 250 g/L.

Comparison Example 1

A honeycomb unit was manufactured by the same method as that in the Example 1 but by extrusion molding using a die having a surface roughness different from that used in the Example 1.

The thickness of the cell wall was 0.33 mm (13 mil); the cell density ρ was 34/cm² (220 cpsi), the surface roughness Ra was 0.5 μm; and the opening ratio was 65%. The amount of zeolite contained in the honeycomb unit per an apparent volume was 250 g/L.

Comparison Example 2

A honeycomb unit was manufactured by the same method as that in the Example 1 but by extrusion molding using a die having a surface roughness different from that used in the Example 1.

The thickness of the cell wall was 0.33 mm (13 mil); the cell density ρ was 34/cm² (220 cpsi), the surface roughness Ra was 40 μm; and the opening ratio was 65%. The amount of zeolite contained in the honeycomb unit per an apparent volume was 250 g/L.

The thickness of the cell wall, the cell density ρ, the surface roughness Ra of the cell wall, the opening ratio, and the blending ratio of each of the Example 1 through Example 10 and the Comparison Example 1 and Comparison Example 2 are shown in the following Table 1.

TABLE 1

|  | THICKNESS OF CELL WALL | | CELL DENSITY | | Ra | OPENING RATIO | BLENDING RATIO | NOx CONVERSION |
| --- | --- | --- | --- | --- | --- | --- | --- | --- |
|  | mil | mm | cpsi | THE NUMBER/cm² | μm | % | — | RATIO % |
| EXAMPLE 1 | 13 | 0.33 | 220 | 34 | 1 | 65 | A | 81 |
| EXAMPLE 2 | 13 | 0.33 | 220 | 34 | 10 | 65 | A | 85 |
| EXAMPLE 3 | 13 | 0.33 | 400 | 62 | 20 | 55 | B | 97 |
| EXAMPLE 4 | 13 | 0.33 | 300 | 47 | 20 | 60 | C | 96 |
| EXAMPLE 5 | 8 | 0.20 | 600 | 93 | 20 | 65 | A | 98 |
| EXAMPLE 6 | 10 | 0.25 | 400 | 62 | 20 | 65 | A | 98 |
| EXAMPLE 7 | 11 | 0.28 | 300 | 47 | 20 | 65 | A | 98 |
| EXAMPLE 8 | 12 | 0.30 | 270 | 42 | 20 | 65 | A | 97 |
| EXAMPLE 9 | 13 | 0.33 | 220 | 34 | 20 | 65 | A | 92 |
| EXAMPLE 10 | 13 | 0.33 | 220 | 34 | 30 | 65 | A | 94 |
| COMPARISON EXAMPLE 1 | 13 | 0.33 | 220 | 34 | 0.5 | 65 | A | 74 |
| COMPARISON EXAMPLE 2 | 13 | 0.33 | 220 | 34 | 40 | 65 | A | 78 |

(Evaluation of NOx Conversion Performance)

The NOx conversion performance with respect to Example 1 through Example 10 and Comparison Example 1 and Comparison Example 2 is evaluated by using the corresponding evaluation samples prepared by the above-mentioned methods.

In the evaluation of the NOx conversion performance, test gas simulating operating conditions of an automobile diesel engine is introduced in each honeycomb unit so as to carry out the NOx conversion. Then, the NO (nitric oxide) amount in the gas exhausted from each honeycomb structure (evaluation sample) is determined.

Composition of the test gas is indicated in the following Table 2.

TABLE 2

| GAS COMPOSITION | DENSITY |
|---|---|
| $CO_2$ | 5 vol % |
| $O_2$ | 14 vol % |
| NO | 350 ppm |
| $NH_3$ | 350 ppm |
| $H_2O$ | 5 vol % |
| $N_2$ | balance |

(SV: 35000/hr)

The evaluation test continues from introducing the test gas into the honeycomb structure (evaluation sample) until the NO (nitric oxide) concentration in the exhaust gas becomes almost stable.

The NO (nitric oxide) concentration was measured by using "MEXA-7100D" manufactured by HORIBA Ltd. having an NO detection limit of 0.1 ppm. The test temperature (of the honeycomb units and the test gas) during the evaluations is maintained at 400° C.

To evaluate the NOx conversion performance, the NOx conversion rate "N" given as follows is used.

$$N(\%) = \{(\text{NO concentration of mixed gas before the mixed gas is introduced in honeycomb unit}) - (\text{NO concentration of the exhaust gas exhausted from the honeycomb unit})\} / (\text{NO concentration of mixed gas before the mixed gas is introduced in honeycomb unit}) \times 100. \quad (3)$$

The results of the measurement are shown in the right end column of Table 1. In addition, a graph showing relationships between surface roughness Ra and a NOx conversion ratio in the Examples and the Comparison Examples is shown in FIG. 4.

The results clearly show that each of the honeycomb units according to the embodiment of the present invention (evaluation samples of Example 1 through Example 10) has a higher NOx conversion ratio than the honeycomb units (evaluation sample) of the Comparison Example 1 and the Comparison Example 2. In particular, it is found, according to FIG. 4, that it is possible to obtain a good NOx conversion ratio in a case where the surface roughness Ra is in the range of approximately 20 μm through approximately 30 μm.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that the various changes, substitutions, and alterations could be made hereto without departing from the spirit and scope of the invention.

What is claimed is:

1. A honeycomb structure comprising:
    at least one honeycomb unit having a longitudinal direction, an opening ratio (P) of at least approximately 50% and at most approximately 65%, and a cell density ρ of at least approximately $3/cm^2$ and at most approximately $93/cm^2$, and the at least one honeycomb unit comprising:
        at least approximately 230 g/L of zeolite, L representing an apparent volume;
        an inorganic binder; and
        a plurality of cell walls extending from a first end to a second end of the at least one honeycomb unit along the longitudinal direction to define cells, the cell walls having a surface roughness Ra of at least approximately 1 μm and at most approximately 30 μm.

2. The honeycomb structure as claimed in claim 1, wherein the at least one honeycomb unit includes at most approximately 270 g/L of zeolite.

3. The honeycomb structure as claimed in claim 1, wherein the zeolite comprises at least one of β-type zeolite, Y-type zeolite, ferrierite, ZSM-5 zeolite, mordenite, faujasite, zeolite A, and zeolite L.

4. The honeycomb structure as claimed in claim 1, wherein, in the zeolite, a weight ratio of silica to alumina is at least approximately 30 and at most approximately 50.

5. The honeycomb structure as claimed in claim 1, wherein the zeolite is made an ion exchange by Fe, Cu, Ni, Co, Zn, Mn, Ti, Ag or V.

6. The honeycomb structure as claimed in claim 1, wherein the at least one honeycomb unit includes at least one of alumina particles, titania particles, silica particles, zirconia particles, and precursors of these particles.

7. The honeycomb structure as claimed in claim 1, wherein the inorganic binder includes at least one of alumina sol, silica sol, titania sol and liquid glass, sepiolite and attapulgite.

8. The honeycomb structure as claimed in claim 1, wherein the at least one honeycomb unit further includes inorganic fibers.

9. The honeycomb structure as claimed in claim 8, wherein the inorganic fibers include at least one of alumina, silica, silicon carbide, silica-alumina, glass, potassium titanate, and aluminum borate.

10. The honeycomb structure as claimed in claim 1, wherein the honeycomb structure comprises a plurality of honeycomb units which are connected via an adhesive layer provided between the plurality of honeycomb units.

11. The honeycomb structure as claimed in claim 1, wherein a coat layer is provided on a peripheral surface of the honeycomb structure except end faces.

12. The honeycomb structure as claimed in claim 10, wherein the honeycomb structure is so constructed that an exterior side of the honeycomb structure is cut to be a predetermined shape.

13. The honeycomb structure as claimed in claim 1, wherein the honeycomb structure is so structured to be used for a NOx deoxidation system.

14. The honeycomb structure as claimed in claim 1, wherein the honeycomb structure is so structured to be used as a catalyst carrier for converting NOx.

15. The honeycomb structure as claimed in claim 1, wherein the honeycomb structure is so structured to be used as a catalyst carrier of a urea NOx deoxidation system.

16. The honeycomb structure as claimed in claim 1, wherein the cell density ρ is at least approximately 47/cm$^2$ and at most approximately 78/cm$^2$.

17. The honeycomb structure as claimed in claim 1, wherein the surface roughness Ra of the cell walls is at least approximately 20 μm and at most approximately 30 μm.

18. The honeycomb structure as claimed in claim 1, wherein an amount of inorganic particles included in the at least one honeycomb unit is at least approximately 30 wt % and at most approximately 90 wt %.

19. The honeycomb structure as claimed in claim 1, wherein an amount of the inorganic binder included in the at least one honeycomb unit as solid content is at least approximately 5 wt % and at most approximately 50 wt %.

20. The honeycomb structure as claimed in claim 8, wherein an amount of the inorganic fibers included in the at least one honeycomb unit is at least approximately 3 wt % and at most approximately 50 wt %.

21. The honeycomb structure as claimed in claim 10, wherein the plurality of honeycomb units having different configurations are jointed via an adhesive.

22. The honeycomb structure as claimed in claim 1, wherein a noble metal catalyst is provided on the cell walls.

* * * * *